(12) United States Patent
Cerutti et al.

(10) Patent No.: US 6,700,577 B1
(45) Date of Patent: Mar. 2, 2004

(54) BIT STRING CONVERSION DEVICE

(75) Inventors: Walter Cerutti, Ivrea (IT); Gianpiero Bianco, Ivrea (IT)

(73) Assignee: Olivetti Tecnost S.p.A., Ivrea (IT)

(*) Notice: Subject to any disclaimer, the term of this patent is extended or adjusted under 35 U.S.C. 154(b) by 0 days.

(21) Appl. No.: 09/936,225

(22) PCT Filed: Feb. 25, 2000

(86) PCT No.: PCT/IT00/00060
§ 371 (c)(1),
(2), (4) Date: Sep. 10, 2001

(87) PCT Pub. No.: WO00/54218
PCT Pub. Date: Sep. 14, 2000

(30) Foreign Application Priority Data

Mar. 8, 1999 (IT) .......................... TO99A0175

(51) Int. Cl.$^7$ .............................. G06T 11/00
(52) U.S. Cl. .................. 345/472; 345/471; 345/3.3
(58) Field of Search ................. 345/467, 468, 345/471, 472, 472.1, 472.2, 3.1, 3.3

(56) References Cited

U.S. PATENT DOCUMENTS 4,771,279 A 9/1988 Hannah

FOREIGN PATENT DOCUMENTS

| EP | 0 574 901 | 12/1993 |
|----|-----------|---------|
| JP | 05-02643 | 1/1993 |
| JP | 09-91415 | 4/1997 |

*Primary Examiner*—Matthew Luu
(74) *Attorney, Agent, or Firm*—Banner & Witcoff

(57) ABSTRACT

This invention relates to a device for converting bit strings from a first resolution to a second resolution suitable for application, in particular, on peripherals such as printers, scanners or facsimile machines. The device comprises a source register 31 in which a string of bits to be converted is stored by a CPU 11, a destination register 32 from which the CPU 11 extracts the converted string, and a pair of control registers 21 and 22 which cooperate for converting bit by bit the bit strings from the source register 31 to the destination register 32. The control registers 21 and 22, the source register 31 and the destination register 32 operate independently from the CPU 11 used and at a clock rate (clk2) greater than that (clk1) of the CPU 11, thereby permitting extremely fast conversion times.

8 Claims, 1 Drawing Sheet

BIT STRING CONVERSION DEVICE

This is a U.S. National Phase Application Under 35 USC 371 and applicants herewith claim the benefit of priority of PCT/IT00/00060 filed Feb. 25, 2000, which was published under PCT Article 21(2) in English, and Italian Application No. TO99A000175 filed in Italy on Mar. 8, 1999.

TECHNICAL FIELD

This invention relates to a device for converting bit strings comprising first control means, first storing means connected to the first control means and suitable for storing first strings of bits representative of source information to be converted, second storing means connected to the first control means and to the first storing means and suitable for storing second strings of bits representative of converted information. In particular, this invention relates to a device and relative method of converting information representing images from one resolution to another.

BACKGROUND ART

It is widely known that the peripheral units connected to an electronic processor such as for instance printers, facsimile machines, scanners, use resolutions that may differ from one peripheral to another or even on the same peripheral.

For example, it is known that a monofunctional peripheral, for instance an ink jet printer, can print with different resolutions, such as 150, 300, 600 dots per inch (or d.p.i.), where 1 inch corresponds in metric terms to about 25.4 mm, whereas a facsimile machine and a scanner may perform the scanning of a document with a resolution of 200 d.p.i. and transfer the information thus generated to the processor or to the printer itself according to resolution different from that of scanning.

It is also known that integrated peripherals are commercially available that are capable of performing various functions, for instance printer, scanner and facsimile functions.

Both the monofunctional and the integrated peripherals are capable, where necessary, of converting information from one resolution to another, but require an exceptionally high processing commitment and times of the central processing unit (CPU).

In fact, to perform conversion of the information from one resolution to another, the CPU of these peripherals uses predefined programs (software) intended for the manipulation of single data bits, an operation which, as will be obvious to those acquainted with the sector art, requires a large number of elementary instructions and accordingly high processing times.

For example, the simple implementation in a printer of an algorithm for conversion from a resolution of 150 d.p.i. to one of 300 d.p.i. requires that each single bit of source data be duplicated; in this operation, assuming a CPU with a normal instruction set, the CPU is required to load a string of the source information bits in an accumulator and, for each bit of this string, to store the same duplicated bit in a second accumulator.

As a result, assuming that for each bit the CPU has to execute at least three elementary instructions and that for each elementary instruction the CPU requires four clock pulses, the CPU will require a total of 16 clock pulses to duplicate each single bit.

In short, the conversion times for single bits of information, according to the known art, are long and necessarily depend both on the CPU, i.e. its instruction set, and on the clock rate.

The technical problem that this invention intends to solve is that of drastically reducing, by a factor of 100 or even more, the times needed by the monofunctional or integrated peripherals to perform the conversion of single data bits, for example in the conversions from one resolution to another, without having recourse, as happens in the known art, to the use of high speed CPUs or those with special instruction sets.

In particular, the invention intends to solve this problem by separating the data conversion functions from the characteristics of the CPU and its clock.

DISCLOSURE OF THE INVENTION

This technical problem is solved by the device for the conversion of bit strings characterized by second control means comprising a predefined number of binary configurations, each representing a conversion algorithm, connected to the first and second storing means and suitable for controlling through each binary configuration the conversion of each bit from the source information to the converted information.

According to a further characteristic of this invention, the data conversion times may be rendered independent from the clock of the CPU by implementing the device according to the invention and the associated method at a clock rate much greater than that of the CPU.

BRIEF DESCRIPTION OF DRAWINGS

This and other characteristics of the present invention will become apparent from the following description of a preferred embodiment, provided by way of a non-restricting example with the aid of the accompanying drawings, in which.

BEST MODE FOR CARRYING OUT THE INVENTION

Figure 1:
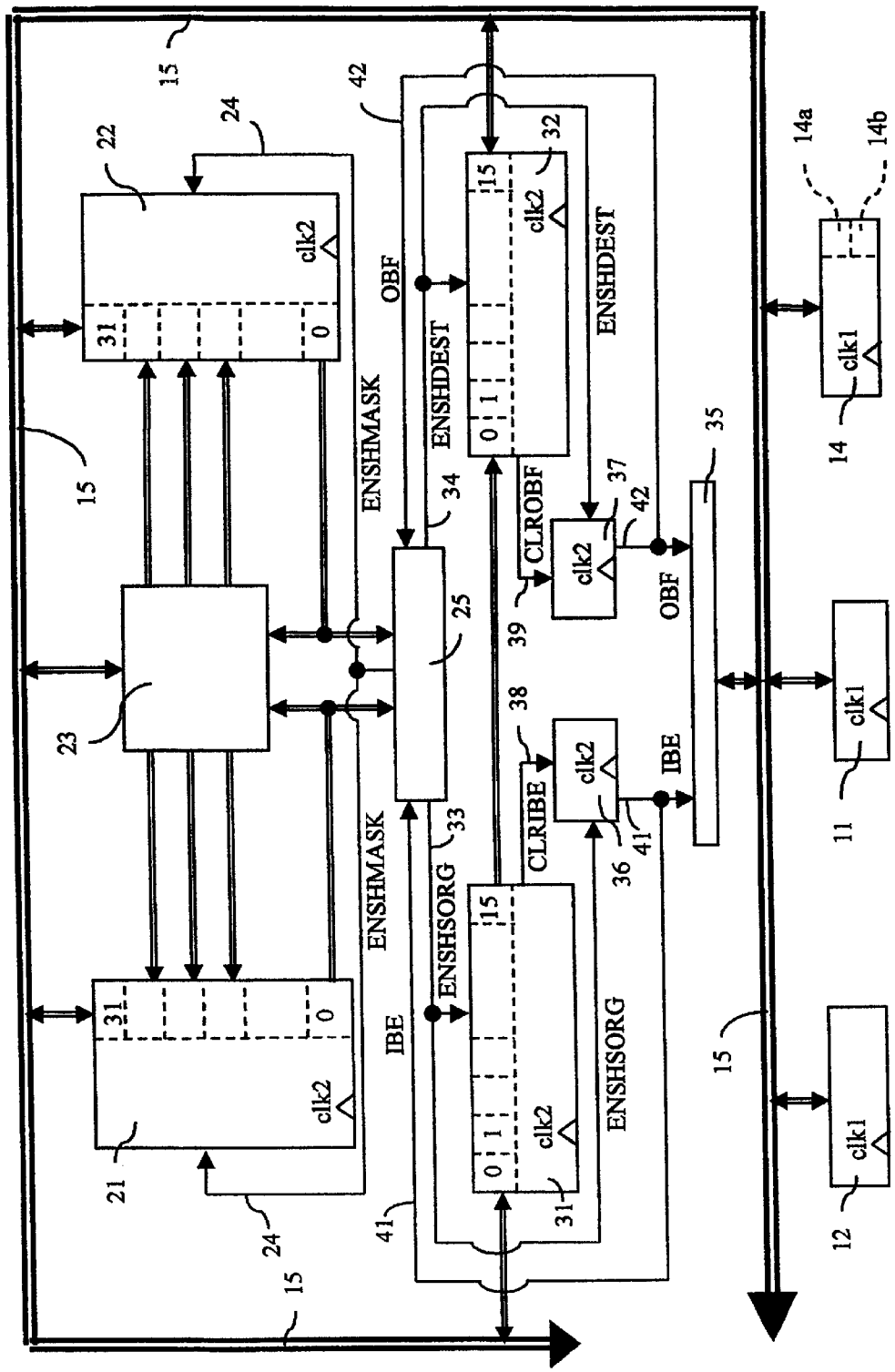
FIG. 1 is a logic diagram of the device according to the invention.

With reference to FIG. 1 the device according to the invention comprises a central processing unit (CPU) 11, of known type, a read only memory (ROM) 12, known in its own right, suitable for memorizing data and programs developed in the device's design stage and a random access memory (RAM) 14, suitable for memorizing the information on which to perform the conversion.

In particular the RAM 14, of known type, comprises a first zone 14a suitable for storing the information to be converted or source information, and a second zone 14b suitable for storing the converted information or output information.

The CPU 11, the ROM 12 and the RAM 14 are connected to each other in a known way by means of a data and address channel (or bus) 15 and are timed, in accordance with this embodiment, at a first clock rate (clk1).

The device also comprises a first and a second control register, 21 and 22 respectively, and a multiplexer circuit 23, all of known type, connected to the bus 15.

The control registers 21 and 22 are, for example, 32-bit shift registers and are suitable for storing strings of bits of variable length, up to a maximum of 32 bits, representing the type of conversion to be effected, as will be described later in detail and, in accordance with this embodiment, are suitable for having a "shift" at a second clock rate (clk2), two or more times greater than clk1.

The storing of the control registers 21 and 22 is effected by the CPU 11 which, in relation to the type of conversion to be performed, is adapted for reading from the ROM 12 a pair of predefined bit strings of equal length and for storing them in the control registers 21 and 22 by means of the bus 15.

The multiplexer 23 is connected to the control registers 21 and 22, and is suitable for enabling the "shifting" of the control registers 21 and 22 by up to the predefined length of the pair of bit strings stored in the same control registers 21 and 22, in relation to the predefined data stored in the ROM 12 and transmitted by the CPU 11 to the multiplexer 23 by means of the bus 15.

The device finally comprises an encoder circuit 25, an input shift register 31, an output shift register 32, a first and a second counter, 36 and 37, associated respectively with the input register 31 and the output register 32, and a status register 35.

The encoder 25, of known type, has a first and a second input connected respectively to the first and the second control register 21 and 22, a first output 33 connected to the input register 31 and to the corresponding counter 36 and a second output 34 connected to the output register 32 and to the corresponding counter 37.

The encoder 25 is suitable for commanding the selective shifting of the input register 31 and of the associated counter 36 and/or of the output register 32 and of the associated counter 37, in relation to the binary configuration of the single pairs of bits input to the encoder 25 itself by the pair of control registers 21 and 22 cooperating with each other.

In particular the encoder 25 is suitable for generating on the first output (wire) 33 a signal "ENSHSORG" to command the shifting of the input register 31 and relative counter 36, and/or on the second output (wire) 34 a signal "ENSHDEST" to command the shifting of the output register 32 and relative counter 37, in accordance with the following truth table.

| Bit 0 Reg. 21 | Bit 0 Reg. 22 | Function |
|---|---|---|
| 0 | 0 | Compression operation, signal "ENSHSORG" only generated; shifting of register 31 only. |
| 0 | 1 | Expansion operation, signal "ENSHDEST" only generated; shifting of register 32 only. |
| 1 | X | Copy operation, signals "ENSHSORG" and "ENSHDEST" generated; shifting of both registers 31 and 32. |

The encoder 25 is also connected, by means of a third output 24, to the control registers 21 and 22, and is adapted for controlling their shifting by sending an enable signal "ENSHMASK" to this third output 24 in parallel with the selective activation of the input register 31 and/or of the output register 32.

The input register 31, for example a 16-bit shift register of known type, has a data input connected to the bus 15, a data output connected to the output register 32, a control output 38 connected to the first counter 36 and is timed, with regard to the shifting, in accordance with clk2.

The input register 31 is suitable for receiving and storing, through the bus 15 and under the control of the CPU 11, a string of source information, read from the zone 14a of the RAM 14 and for transmitting, in parallel, by means of the control output 38, a signal "CLRIBE" to the counter 36.

The input register 31 is also suitable for performing the shifting of a bit depending on whether signal "ENSHSORG" is present on the wire 33 and for transferring a bit to the output register 32 during the shifting.

The output register 32, for example a 16-bit shift register of known type, has a data output connected to the bus 15 and a control output 39 connected to the second counter 37, and is timed, with regard to the shifting, in accordance with clk2.

The output register 32 is suitable for transferring, under the control of the CPU 11, strings of output information into the zone 14b of the RAM 14 and for transmitting, in parallel, by means of the control output 39, a signal "CLROBF" to the counter 37.

The output register 32 is also suitable for performing the shifting by 1 bit, depending on whether the control signal "ENSHDEST" is present on the wire 34.

The first counter 36, for example a counter by 16 of known type, has a control output (first counter output) 41 connected to the status register 35 and to the encoder 25, and is suitable for generating a buffer empty signal (flag) "IBE" once the shifting of the input register 31 is complete (reading of the source information string) and for lowering this flag when signal "CLRIBE" is present.

The second counter 37, for example a 16-bit counter of known type, has a control output (second counter output) 42 connected to the status register 35 and to the encoder 25, and is suitable for generating a buffer full signal (flag) "OBF" once the shifting of the output register 32 is complete (writing of the output information string) and for lowering this flag when signal "CLROBF" is present.

The status register 35, of known type, is connected to the bus 15 and is suitable for being selected and read by the CPU 11 for detecting the presence of flag "IBE" and/or "OBF".

Operation of the device described up to this point is as follows.

Once a predefined type of conversion has been selected through an appropriate program, the CPU 11 reads from the ROM 12 the pair of bit strings corresponding to the conversion algorithm to be performed and stores it by means of the bus 15 in the control registers 21 and 22.

Furthermore the CPU 11, depending on the length of these bit strings, presets the multiplexer 23 in such a way as to constrain the reading of the control registers 21 and 22 in rotation in accordance with the length of the pair of bit strings.

Finally, the CPU 11 commands the reading from the first zone 14a of the RAM 14 of a first string of source information to be converted and stores it in the input register 31 which, in turn, resets the first counter 36 by means of the control wire 38.

From this point the device can effect the conversion selected at the rate clk2 without any further intervention of the CPU 11.

For example, assuming that a data conversion from a resolution of 200 d.p.i. to a resolution of 600 d.p.i. has been selected, the control registers 21 and 22 will contain, for example, the following strings of 18 bits:

| Reg. 21 | 1 | 0 | 0 | 1 | 0 | 0 | 1 | 0 | 0 | 1 | 0 | 0 | 1 | 0 | 0 | 1 | 0 | 0 |
|---|---|---|---|---|---|---|---|---|---|---|---|---|---|---|---|---|---|---|
| Reg. 22 | 0 | 1 | 1 | 0 | 1 | 1 | 0 | 1 | 1 | 0 | 1 | 1 | 0 | 1 | 1 | 0 | 1 | 1 |

At the first clock pulse clk2 the first binary configuration "1 0" is transmitted to the encoder 25 which generates as output, in accordance with the truth table described, the signals "ENSHSORG" and "ENSHDEST" with consequent shifting of the input and output registers, 31 and 32, and copying of a bit from the input register 31 to the output register 32.

At the second clock pulse clk2, the second binary configuration "0 1" is transmitted to the encoder 25 which generates as output signal "ENSHDEST" only, with consequent shifting of only the output register 32 and duplication of the bit present on the output by the input register 31.

At the third clock pulse clk2, the third binary configuration "0 1", identical to the second one, is transmitted to the encoder 25 which generates as output signal "ENSHDEST" only, with consequent shifting of only the output register 32 and duplication or expansion of the bit present on the output by the input register 31.

At the fourth clock pulse clk2, what was described for the first clock pulse clk2 is repeated, and so on.

As will be apparent, the conversion of the example involves the output register 32 completing the first shifting before the input register 31 and accordingly the second counter 37 completing its count first.

As a result, the second counter 37, at the end of the count, generates as output the flag "OBF" (output buffer full) and transmits it to the status register 35 and to the encoder 25 by means of the control output 42.

On receiving the flag "OBF" the encoder 25 stops the conversion process by holding the registers 21, 22, 31, 32 and the counters 36, 37 blocked for as long as the flag "OBF" is raised, whereas the CPU 11, once the flag "OBF" is intercepted, reads the contents from the output register 32 and stores them, by means of the bus 15, in the second zone 14b of the RAM 14.

The output register 32, in turn, sends the counter 37, by means of the control wire 39, the signal "CLROBF" and the counter 37 lowers the flag "OBF" permitting the encoder 25 to release the conversion process.

If it is assumed, on the other hand, that a data conversion from a resolution of 600 d.p.i. to one of 200 d.p.i. has been selected, the control registers 21 and 22 will, for example, contain the following strings of 18 bits:

sequent shifting of only the input register 31 and loss (compression) of the bit transmitted in output by the input register 31.

At the third clock pulse clk2, the third binary configuration "0 0" is transmitted to the encoder 25 which generates as output signal "ENSHSORG" only, with consequent shifting of only the input register 31 and loss of the bit transmitted in output by the input register 31.

At the fourth clock pulse clk2, what was described for the first clock pulse is repeated, and so on.

As will be apparent, in this second case, the conversion involves the input register 31 completing the first shifting before the output register 32 and accordingly the first counter 36 completing its count first.

As a result, the first counter 36 at the end of the count generates as output the flag "IBE" (input buffer empty) and transmits it to the status register 35 and to the encoder 25 by means of the control output 41.

On reception of the flag "IBE" the encoder 25 stops the conversion process by holding the registers 21, 22, 31, 32 and the counters 36, 37 blocked for as long as the flag "IBE" is raised.

The CPU 11, once the flag "IBE" is intercepted, reads from the first zone 14a of the RAM 14 a further string of source information to be converted and stores it in the input register 31 which, in turn, transmits the signal "CLRIBE" by means of the control wire 38 to the counter 36 in order to lower the flag "IBE" and permit the encoder 25 to release the conversion process.

From the conversion examples discussed above, it is easy to deduce that the device according to the invention permits the implementation of any conversion algorithm, either through the definition of pairs of bit strings of length variable with the variation of the algorithm or through the definition of a truth table comprising at least three basic functions, such as copying, expansion and compression of single bits.

It may also be inferred from the examples that the speed of conversion depends solely on the shifting speed of the registers 21, 22, 31 and 32 and of the counters 36 and 36, as the CPU 11 only intervenes in the conversion process in the step of writing the source information in the input register 31 or in the step of reading the output information from the

| Reg. 21 | 1 | 0 | 0 | 1 | 0 | 0 | 1 | 0 | 0 | 1 | 0 | 0 | 1 | 0 | 0 | 1 | 0 | 0 |
|---|---|---|---|---|---|---|---|---|---|---|---|---|---|---|---|---|---|---|
| Reg. 22 | 0 | 0 | 0 | 0 | 0 | 0 | 0 | 0 | 0 | 0 | 0 | 0 | 0 | 0 | 0 | 0 | 0 | 0 |

At the first clock pulse clk2, the first binary configuration "1 0" is transmitted to the encoder 25 which generates as output, in accordance with the truth table, the signals "ENSHSORG" and "ENSHDEST" with consequent copying of a bit from the input register 31 to the output register 32.

At the second clock pulse clk2, the second binary configuration "0 0" is transmitted to the encoder 25 which generates as output signal "ENSHSORG", only with conoutput register 32, depending on whether the flag "IBE" and/or "OBF" is present in the status register 35. Furthermore, in the steps of writing and reading the CPU 11 works on strings of source and output information, and not on the single bits.

Naturally the truth table may be defined differently and the encoder 25 can operate in accordance with truth tables having different binary configurations, without departing from the scope of the invention.

The length of the control registers 21 and 22, of the input and output registers 31 and 32, and of the counters 36 and 37, may be different from that described in the present embodiment, again without departing from the scope of the invention.

Changes may be made to the dimensions, shapes, materials, components, circuit elements, connections and contacts, as also to the the circuitry and construction details illustrated and to the method of operation without departing from the scope of the invention.

What is claimed is:

1. Device for bit string conversion comprising first control means (11);

first storing means (31) connected to said first control means (11) and suitable for storing first bit strings representative of source information to be converted;

second storing means (32) connected to said first control means (11) and to said first storing means (31) and suitable for storing second bit strings representative of converted information; characterized by second control means (21, 22, 25) comprising a predefined number of binary configurations, each representative of a conversion algorithm, connected to said first (31) and second (32) storing means and suitable for controlling through said binary configurations the conversion of each bit from said source information to said converted information; wherein said first control means (11) is timed at a first clock rate and said first storing means (31), said second storing means (32) and said second control means (21, 22, 25) are timed at a predefined clock rate different from that of said first control means (11).

2. Device according to claim 1 characterized in that said binary configurations are comprised by pairs of bits.

3. Device according to claim 2 characterized in that said pairs of bits comprise at least three different configurations.

4. Device according to claim 1 characterized in that said second control means (21, 22, 25) comprises a pair of shift registers (21, 22) suitable for transmitting said binary configurations; and an encoder circuit (25) connected to said pair of shift registers (21, 22) and suitable for selectively commanding said first (31) and said second (32) storing means in relation to said binary configurations.

5. Device according to claim 4 characterized in that said first (31) and second (32) storing means each comprise at least one shift register.

6. Method for the conversion of bit strings comprising the step of storing at a first clock rate a bit string representative of source information to be converted in first storing means (31); characterized by the steps of applying at a second clock rate a conversion algorithm to each bit of said first bit string; and selectively storing each of said bits from said first storing means (31) in second storing means (32) in accordance with said second clock rate and said conversion algorithm in order to compose in said second storing means (32) a second bit string representative of a string of converted information.

7. Device according to claim 2 characterized in that said second control means (21, 22, 25) comprises a pair of shift registers (21, 22) suitable for transmitting said binary configurations; and an encoder circuit (25) connected to said pair of shift registers (21, 22) and suitable for selectively commanding said first (31) and said second (32) storing means in relation to said binary configurations.

8. Device according to claim 7 characterized in that said first (31) and second (32) storing means each comprise at least one shift register.

* * * * *